March 8, 1966     J. SIPUSIC     3,239,106
TAR AND GRAVEL LAYING HAND CART
Filed Aug. 12, 1963     2 Sheets-Sheet 1
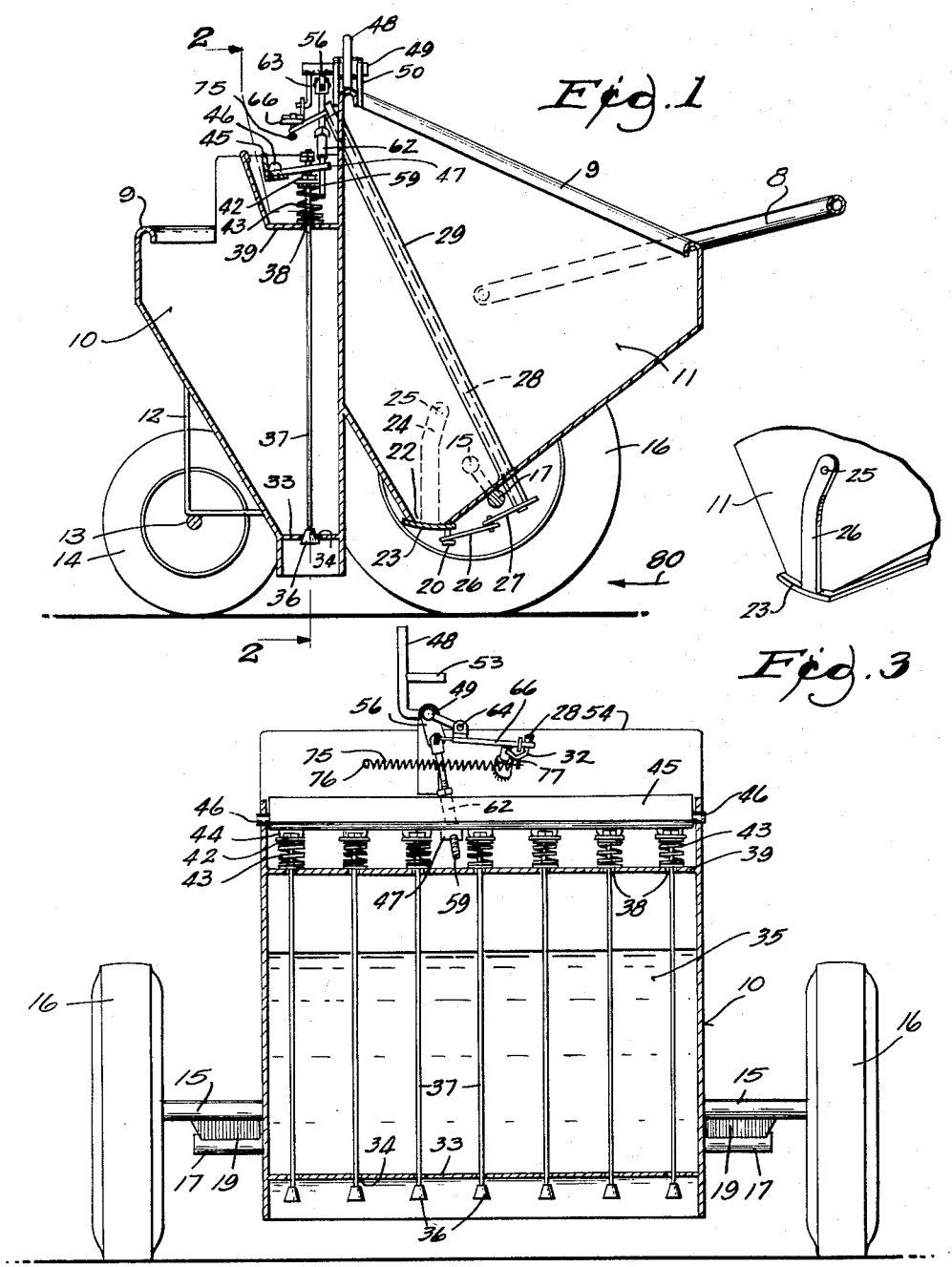
INVENTOR.
JOHN SIPUSIC
BY
Wheely, Wheely & Wheely
ATTORNEYS March 8, 1966 J. SIPUSIC 3,239,106
TAR AND GRAVEL LAYING HAND CART
Filed Aug. 12, 1963 2 Sheets-Sheet 2

INVENTOR.
JOHN SIPUSIC
BY
Wheeler, Wheeler & Wheeler
ATTORNEYS

United States Patent Office 3,239,106
Patented Mar. 8, 1966

3,239,106
TAR AND GRAVEL LAYING HAND CART
John Sipusic, 7716 W. Beloit Road, Milwaukee, Wis.
Filed Aug. 12, 1963, Ser. No. 301,406
8 Claims. (Cl. 222—134)

This invention relates to a tar and gravel laying hand cart.

According to the present invention, tar and gravel reservoirs are combined in a unitary wheeled assembly for concurrent manipulation in the laying of composite strips of tar and gravel wherever required, for example, on roofs of buildings. It is desirable that the respective rates of flow of the tar and gravel be selectively controllable, as different rates are required depending on the pitch of the roof.

For this purpose, novel valve control means is herein disclosed whereby the rate of flow from the tar and gravel reservoirs are selectively adjustable. Notwithstanding such adjustment, the valve means which controls the ports for the respective tar and gravel reservoirs are concurrently actuated by a common lever to simplify operation of the cart.

Other objects, features and advantages of the invention will appear from the following disclosure in which:

FIG. 1 is a vertical cross section taken through an embodiment of the invention.

FIG. 2 is a vertical cross section taken along the line 2—2 of FIG. 1, the valve control mechanism being shown in its open position.

FIG. 3 is a fragmentary perspective view showing details of the slide gate for the outlet port of the gravel reservoir.

Figure 4:
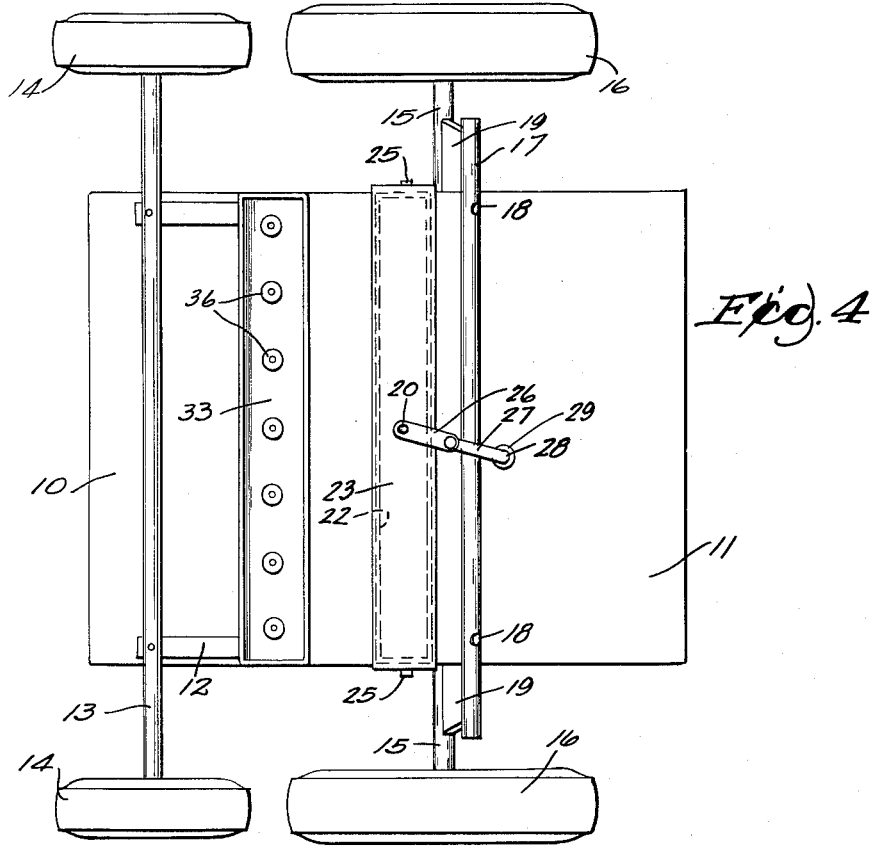
FIG. 4 is a bottom view of the device shown in FIG. 1.

Although the disclosure hereof is detailed and exact to enable those skilled in the art to practice the invention, the physical embodiments herein discolsed merely exemplify the invention which may be embodied in other specific structure. The scope of the invention is defined in the claims appended hereto.

The hand cart of the present invention is fabrictaed principally out of sheet metal and comprises a tar reservoir 10 and a gravel reservoir 11. Reservoir 11 has a swing handle 8 by which the cart is pushed by its operator. The sheet metal walls defining said reservoirs are welded together in a unitary assembly and have their upper edges rolled as indicated at 9.

The tar reservoir 10 is provided with axle brackets 12 on which front axle 13 is mounted. Front wheels 14 are journaled rotatably on the ends of axle 13. Gravel reservoir 11 is provided with an axle 15 on which the rear wheels 16 are rotatably journaled. Axle 15 is desirably braced by cross bar 17 which is fastened by the bolts 18 to reservoir 11 and is cross connected to the axle 15 by webs 19.

Both reservoirs 11, 12 slope downwardly toward their outlet ports. Gravel reservoir 11 has a bottom opening or port 22 which is adjustably closed by swing plate or valve 23 which is suspended on link arms 24 which are pivotally connected to the sides of the reservoir 11 on pins 25.

Swing plate 23 is connected by pin 20 and articulated links 26, 27 to the shaft 28 which passes through a protective tube 29 extending through the gravel reservoir 11. Link 27 is fast to the end of shaft 28. The upper end of shaft 28 has a crank arm 32 by which it may be turned to transmit motion through the links 26, 27 to selectively open and close the plate 23 with respect to port 22.

The bottom of the tar reservoir 10 is provided with a bottom plate 33 having a series of port holes 34 through which the tar 35 in reservoir 10 is discharged by gravity. Beneath the plate 33 are a corresponding series of conical valve plugs 36. Each plug 36 has a stem 37 which extends upwardly through the tar reservoir and through an aligned hole 38 in a spring abutment plate 39 which spans across the top of the tar reservoir 10. Each rod 37 has a fixed collar 42 and a bias spring 43 between the collar 42 and the abutment plate 39. Accordingly, the springs 43 bias the stems 37 upwardly to tend to seat the plugs 36 in the portholes 34 and preclude flow of tar therethrough.

The stems 37 are subject to the imposition of downward pressure thereon by respective fingers 44 which are mounted on a common rocker arm 45 which is journaled on its end pins 46 in the side walls of the tar reservoir 10. Rocker arm 45 is provided with a crank actuator arm 47. When down pressure is exerted on the crank arm 47, rocker arm 45 will turn clockwise as viewed in FIG. 1 to press its fingers 44 against the collars 42 on their respective valve stems 37 and overcome the bias of the springs 43 to concurrently open all of the valve plugs 36. When down pressure is released from the crank arm 47, springs 43 will concurrently lift the stems 37 and reclose the plugs 36. Because the plugs 36 are conical, the degree of movement thereof from the plate 33 will affect the rate of tar flow through the holes 34.

The swing plate valve 23 for the gravel reservoir 11 and the plug valves 36 for the tar reservoir 10 are concurrently actuated by respective linkages connected to a swing lever 48 which rotates on shaft 49 journaled between the yoke arms 50.

Figures 5, 6:
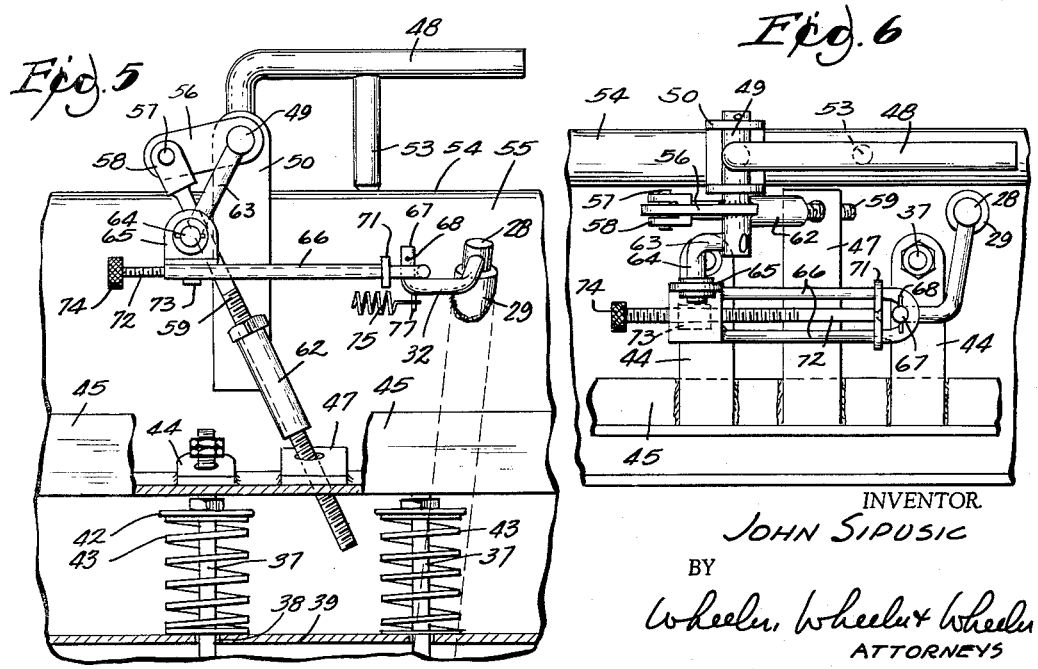
FIG. 5 is a greatly enlarged fragmentary view of the valve control mechanism showing the mechanism in its valve closed position.
FIG. 6 is a plan view of the apparatus shown in FIG. 5.

Swing lever 48 desirably has limit foot 53 which bears in its position shown in FIG. 5 against the rolled top edge 54 of the wall 55 which separates the tar reservoir 10 from the gravel reservoir 11.

Motion is transmitted from the swing lever 48 to the crank arm 47 for the valve plugs 36 through a linkage system including crank 56 (FIGS. 5 and 6) which is fixed to the shaft 49. Crank 56 is pivotally connected on the pin 57 to clevis 58 on the end of a threaded push rod 59. Push rod 59 adjustably carries nut 62 which may selectively be advanced axially on the threads of the push rod 59 toward and away from the crank arm 47, thus to adjust the effective throw of push rod 59 and the degree of opening of the conical plugs 36. For example, as nut 62 is advanced toward the crank arm 47, the two will engage earlier in the cycle of movement of the swing lever 48 from its position shown in FIG. 5 toward its position shown in FIG. 2. Accordingly, the plugs 36 will be spaced farther from the bottom plate 33 as a consequence thereof and the rate of tar flow increased.

Motion is transmitted from the swing lever 48 to the crank 32 on shaft 28 for the gravel reservoir swing plate 23 by crank 63 which has a laterally turned end portion 64 pivotally engaged with ear 65 of bifurcated link 66. The end of the bifurcated link 66 remote from its connection with the crank 63 has a lost motion connection with upturned end 67 of crank arm 32. Said end 67 has a cross pin 68 which spans across the bifurcations of the link 66 to retain said end 67 in lost motion connection with the link 66.

Link 66 carries a thrust plate 71 on a push rod 72 having a swivel connection with the plate 71. Rod 72 has a threaded connection with nut 73 fixed to the link 66. The throw of the link 66 can be adjusted by turning on the knurled knob 74 to advance or retract plate 71. Accordingly the point in time of the cycle of movement of the swing lever 48 from its position shown in FIG. 5 to its position shown in FIG. 2 when the push plate 72 engages turned end 67 of crank 32 is adjustable in accordance with the degree of advancement or retraction of the push plate 71. This will determine the degree of opening of the swing valve 23 for the outlet port 22 of the gravel reservoir 11.

A spring 75 is desirably connected between an anchorage 76 on wall 55 and a peg 77 on the crank arm 32 in order to bias the crank 32 toward its position in which the port 22 is closed by the plate 23. With the swing lever 48 fully open to its position shown in FIG. 2, however, the pin 64 has traveled over center thus to lock the handle 48 in open position, in the manner of a toggle. As soon as handle 48 is turned clockwise as viewed in FIG. 2 far enough to release the toggle, spring 75 is effective to give snap action to the closure of the respective valves for the tar and gravel ports.

In operation the respective reservoirs are filled with liquid tar and gravel. The nut 62 and knurled knob 74 are adjusted to give the proper flow ratio of tar to gravel. Lever 48 is swung to its open position as shown in FIG. 2. This concurrently opens the tar valve plugs 36 and the gravel slide valve 23 to the extent determined by the positions of the nut 62 and knurled knob 74. The cart is then pushed on the desired path in the direction of arrow 80. Tar will flow in ribbons through the holes 34 and the ribbons of tar will merge into a tar strip as wide as the cart and to the desired thickness. (Usually about one-half inch.) Gravel will flow through the port 22 to add a layer of gravel on top of the tar. Tht operator pushing the cart will walk on the gravel. When one composite strip is layed, the swing arm 48 will be turned to its position shown in FIG. 5 thus closing both the tar reservoir port and the gravel reservoir port. The cart may then be turned around to make a return sweep on an adjacent path and the handle 48 again swung open to lay another composite strip of tar and gravel.

I claim:

1. A hand cart for laying a composite strip of tar and gravel as the cart moves on a path of travel, said cart comprising:
   (a) a tar reservoir having an outlet port,
   (b) a gravel reservoir having an outlet port,
   (c) wheeled vehicle means holding said reservoirs in a unitary assembly and in tandem relation along the path of travel of the cart,
   (d) valve means for the respective ports aforesaid, and
   (e) control means for the concurrent actuation of said valve means to produce concurrent flow of tar and gravel to merge into said composite strip as the cart moves on its path of travel,
   (f) said control means comprising means for adjusting the relative degree of opening of one of said ports with respect to the other of said ports.

2. A tar and gravel laying hand cart comprising a tar reservoir having an outlet port, a gravel reservoir having an outlet port, means holding said reservoirs in a unitary assembly, valve means for the respective ports aforesaid, and control means for the concurrent actuation of said valve means, the port for the tar reservoir comprising a bottom plate for the tar reservoir having a series of holes, the valve means therefor comprising plugs beneath the plate and having stems projecting upwardly through said holes, a spring abutment plate above the level of the tar reservoir and having holes through which said stems project, springs coiled about said rods and bearing on said abutment plate to bias said stems upwardly and the valve plugs thereon into the holes in the bottom plate, and means for concurrently depressing all of said stems against the bias of said springs.

3. The device of claim 1 in which the respective valve means have crank operators, said control means comprising a swing handle and separate linkage means from the swing handle to the respective crank operators for turning said crank operators.

4. The device of claim 3 in combination with spring actuated toggle means to hold the handle in valve open position.

5. The device of claim 3 in which each said linkage means is provided with means for selectively adjusting its effective throw.

6. The device of claim 5 in which the last mentioned means comprises screw threaded nut adjusters.

7. A tar and gravel laying hand cart comprising:
   (a) a tar reservoir having an outlet port,
   (b) a gravel reservoir having an outlet port,
   (c) means holding said reservoirs in a unitary assembly,
   (d) valve means having crank operators for the respective ports aforesaid,
   (e) control means for the concurrent actuation of said crank operators and comprising a swing handle, separate linkage means from the swing handle to the respective crank operators for turning the same and means for selectively adjusting the effective throw of each said linkage means to adjust the relative degree of opening of one of said ports with respect to the other of said ports,
   (f) the outlet port for the tar reservoir comprising a bottom plate having a series of holes with valve plugs and valve stems and means for transmitting the motion of said crank operator to said valve stems,
   (g) the outlet port for the gravel reservoir comprising a slot at the bottom thereof and the valve means comprising a slide plate movable across said slot.

8. The device of claim 7 in which the control means for the gravel reservoir slide plate further includes a rotating shaft having said crank operator attached thereto.

References Cited by the Examiner

UNITED STATES PATENTS

| 1,371,370 | 3/1921 | Hill _____ 222—486 |
| 1,723,234 | 8/1929 | Gwynne et al. _____ 222—446 X |
| 1,751,565 | 3/1930 | Talbott _____ 222—486 X |
| 2,883,996 | 4/1959 | Blewett et al. _____ 222—509 X |
| 2,885,122 | 5/1959 | Bruck _____ 222—177 |
| 2,956,486 | 10/1960 | Siegle _____ 222—176 X |

RAPHAEL M. LUPO, *Primary Examiner.*